United States Patent
Chung et al.

(10) Patent No.: US 8,940,196 B2
(45) Date of Patent: Jan. 27, 2015

(54) SILICON BASED SHAPE MEMORY ALLOY NEGATIVE ACTIVE MATERIAL, NEGATIVE ACTIVE MATERIAL COMPOSITION INCLUDING SAME, RECHARGEABLE LITHIUM BATTERY INCLUDING SAME, AND METHOD OF PREPARING SAME

(75) Inventors: Byung-Joo Chung, Yongin-si (KR); Chun-Gyoo Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/570,413

(22) Filed: Aug. 9, 2012

(65) Prior Publication Data
US 2013/0130112 A1    May 23, 2013

(30) Foreign Application Priority Data

Nov. 17, 2011    (KR) .......................... 10-2011-0120470

(51) Int. Cl.
| | |
|---|---|
| H01B 1/02 | (2006.01) |
| H01B 1/22 | (2006.01) |
| C22C 1/02 | (2006.01) |
| H01M 4/133 | (2010.01) |
| H01M 4/134 | (2010.01) |
| H01M 4/36 | (2006.01) |
| H01M 4/38 | (2006.01) |
| H01M 4/587 | (2010.01) |
| B22F 1/02 | (2006.01) |

(Continued)

(52) U.S. Cl.
CPC .................. *C22C 1/02* (2013.01); *H01M 4/133* (2013.01); *H01M 4/134* (2013.01); *H01M 4/364* (2013.01); *H01M 4/366* (2013.01); *H01M 4/38* (2013.01); *H01M 4/386* (2013.01); *H01M 4/587* (2013.01); *B22F 1/02* (2013.01); *C22C 19/03* (2013.01); *C22C 1/1036* (2013.01); *C23C 24/08* (2013.01); *B82Y 30/00* (2013.01); *C22C 30/00* (2013.01); *C22C 30/04* (2013.01); *H01B 1/02* (2013.01); *H01B 1/04* (2013.01); *H01M 4/622* (2013.01); *H01M 4/625* (2013.01); *H01M 10/052* (2013.01); *H01M 2004/021* (2013.01); *Y02E 60/122* (2013.01); *B22F 1/004* (2013.01); *C22C 9/00* (2013.01)
USPC ....... 252/513; 252/503; 16/110.1; 204/192.2; 429/217; 429/223; 429/231.8

(58) Field of Classification Search
USPC .......... 252/503, 513; 16/110.1; 429/217, 223, 429/231.8; 204/192.2
See application file for complete search history.

(56) References Cited

U.S. PATENT DOCUMENTS

| | | | |
|---|---|---|---|
| 7,432,014 B2 | 10/2008 | Konishiike et al. | |
| 7,459,233 B2 | 12/2008 | Konishiike et al. | |

(Continued)

FOREIGN PATENT DOCUMENTS

| | | |
|---|---|---|
| JP | 2005-141991 | 6/2005 |
| JP | 2005-141992 | 6/2005 |

(Continued)

*Primary Examiner* — Khanh Tuan Nguyen
(74) *Attorney, Agent, or Firm* — Lee & Morse, P.C.

(57) ABSTRACT

A silicon-based shape memory alloy negative active material includes a silicon-based material precipitated on a $Ni_2Mn_{1-X}Z_X$ shape memory alloy basic material. In the silicon-based shape memory alloy negative active material, X satisfies the relationship $0 \leq X \leq 1$ and Z is one of Al, Ga, In, Sn, or Sb.

16 Claims, 1 Drawing Sheet

(51) Int. Cl.
  *C22C 19/03* (2006.01)
  *C22C 1/10* (2006.01)
  *C23C 24/08* (2006.01)
  *B82Y 30/00* (2011.01)
  *C22C 30/00* (2006.01)
  *C22C 30/04* (2006.01)
  *H01B 1/04* (2006.01)
  *H01M 4/62* (2006.01)
  *H01M 10/052* (2010.01)
  *H01M 4/02* (2006.01)
  *B22F 1/00* (2006.01)
  *C22C 9/00* (2006.01)

(56) References Cited

U.S. PATENT DOCUMENTS

| | | | |
|---|---|---|---|
| 7,625,668 | B2 | 12/2009 | Konishiike et al. |
| 2008/0216285 | A1* | 9/2008 | Browne et al. ............... 16/110.1 |
| 2013/0122374 | A1* | 5/2013 | Verbrugge et al. .......... 429/231.8 |

FOREIGN PATENT DOCUMENTS

| | | | | |
|---|---|---|---|---|
| JP | 2005-141995 | * | 6/2005 | ............. H01M 4/02 |
| KR | 2005-0043653 A | | 5/2005 | |
| KR | 2010-0078440 A | | 7/2010 | |

* cited by examiner

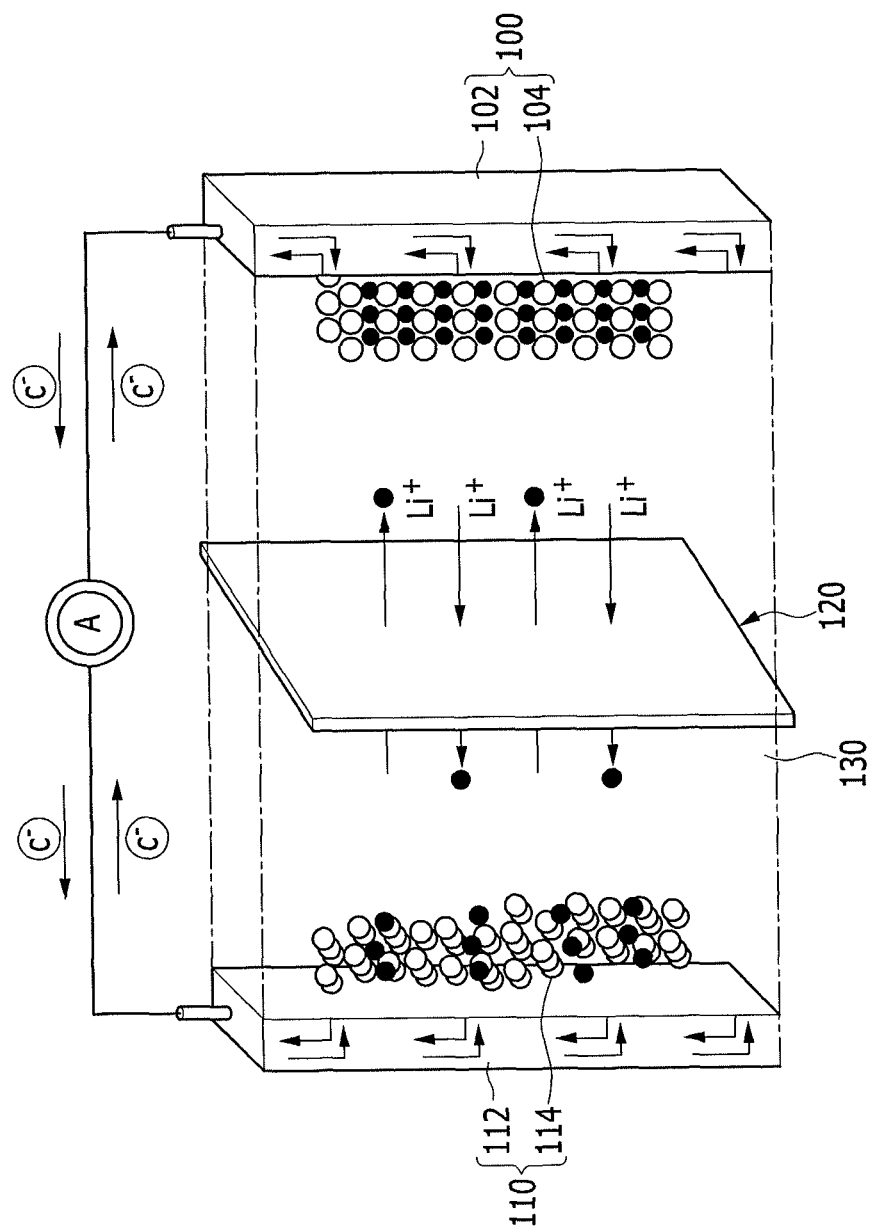

SILICON BASED SHAPE MEMORY ALLOY NEGATIVE ACTIVE MATERIAL, NEGATIVE ACTIVE MATERIAL COMPOSITION INCLUDING SAME, RECHARGEABLE LITHIUM BATTERY INCLUDING SAME, AND METHOD OF PREPARING SAME

BACKGROUND

Communication devices and portable electric devices, such as video camera, portable phones, laptop, etc., are becoming smaller and down-sized. Accordingly, the batteries used as the power source for the devices are also required to become smaller and lighter in weight while having a high energy density. The batteries may be rechargeable batteries.

SUMMARY

Embodiments may be realized by providing a silicon-based shape memory alloy negative active material that includes a silicon-based material precipitated on a $Ni_2Mn_{1-X}Z_X$ shape memory alloy basic material. In the silicon-based shape memory alloy negative active material, $0 \leq X \leq 1$ and Z is one of Al, Ga, In, Sn, or Sb.

The $Ni_2Mn_{1-X}Z_X$ shape memory alloy basic material may have a grain size of about 0.1 nm to about 500 nm. The silicon-based material may have a particle diameter of about 10 nm to about 200 nm.

The silicon-based material may include at least one selected from Si, a $SiO_x$, a Si—C composite, a Si—Y alloy, and a combination thereof, $0<x<2$, and Y is an element selected from an alkali metal, an alkaline-earth metal, a transition element, a Group 13 element, a Group 14 element, a Group 15 element, a Group 16 element, a rare earth element, and a combination thereof. Y may be selected from Li, Mg, Ca, Sr, Ba, Ti, V, Cr, Mn, Fe, Co, Ni, Cu, Zn, Zr, Nb, Mo, Ru, Rh, Pd, Ag, Cd, Hf, Ta, W, Re, Os, Ir, Pt, Au, Hg, Al, Sn, Sb, and a combination thereof.

The silicon-based material is included in an amount of about 60 wt % to about 100 wt %, based on an amount of the $Ni_2Mn_{1-X}Z_X$ shape memory alloy basic material.

Embodiments may be realized by providing a negative active material composition that includes the negative active material, a conductive material, and a binder.

The negative active material composition may further include at least one of negative active material selected from a graphite, a graphene, and a carbon nanowire. The conductive material may include at least one selected from a natural graphite, an artificial graphite, a carbon black, an acetylene black, a ketjen black, and a carbon fiber.

The binder may be selected from a polyvinylidene fluoride, a polyimide, a polyamideimide, a styrene-butadiene rubber, an acrylate styrene-butadiene rubber, an acrylonitrile-butadiene rubber, an acrylic rubber, a butyl rubber, a fluorine rubber, a polytetrafluoroethylene, a polyethylene, a polypropylene, an ethylenepropylene copolymer, a polyethyleneoxide, a polyvinylpyrrolidone, a polyepichlorohydrine, a polyphosphazene, a polyacrylonitrile, a polystyrene, an ethylenepropylenediene copolymer, a polyvinylpyridine, a chlorosulfonated polyethylene, a latex, a polyester resin, an acrylic resin, a phenolic resin, an epoxy resin, a polyvinylalcohol, and a combination thereof.

The conductive material may be included in an amount of about 5 wt % to about 20 wt %, based on an amount of the negative active material composition. The binder may be included in an amount of about 5 wt % to about 20 wt %, based on an amount of the negative active material composition.

Embodiments may also be realized by providing a rechargeable lithium battery that includes a negative electrode including the negative active material, a positive electrode including a positive active material, and an electrolyte solution.

Embodiments may also be realized by providing a method for preparing a silicon-based shape memory alloy negative active material where a silicon-based material is precipitated on a shape memory alloy basic material, the method includes mixing and melting a $Ni_2Mn_{1-X}Z_X$ shape memory alloy basic material and a silicon-based material so as to produce a mixture, wherein $0 \leq X \leq 1$ and Z is Al, Ga, In, Sn, or Sb, and quenching the mixture.

The mixing and melting may include heating the mixture at a temperature of about 1000° C. to about 1500° C. and maintaining the temperature for about 1 hour to about 10 hours. The quenching process may be performed such that the shape memory alloy basic material has a grain size of about 0.1 nm to about 500 nm. The quenching process may be performed such that the silicon-based material has a particle diameter of about 10 nm to about 200 nm.

The silicon-based material may be at least one selected from Si, a $SiO_x$, a Si—C composite, a Si—Y alloy, and a combination thereof, $0<x<2$, and Y is an element selected from an alkali metal, an alkaline-earth metal, a transition element, a Group 13 element, a Group 14 element, a rare earth element, and a combination thereof. Y may be selected from Li, Mg, Ca, Sr, Ba, Ti, V, Cr, Mn, Fe, Co, Ni, Cu, Zn, Zr, Nb, Mo, Ru, Rh, Pd, Ag, Cd, Hf, Ta, W, Re, Os, Ir, Pt, Au, Hg, Al, Sn, Sb, and a combination thereof.

During the mixing and melting, the silicon-based material may be included in an amount of about 60 wt % to about 100 wt %, based on an amount of the $Ni_2Mn_{1-X}Z_X$ shape memory alloy basic material.

BRIEF DESCRIPTION OF THE DRAWING

Features will become apparent to those of ordinary skill in the art by describing in detail exemplary embodiments with reference to the attached drawing in which:

FIG. 1 illustrates a schematic view showing a rechargeable lithium battery according to an exemplary embodiment.

DETAILED DESCRIPTION

Korean Patent Application No. 10-2011-0120470, filed on Nov. 17, 2011, in the Korean Intellectual Property Office, and entitled: "Silicon Based Shape Memory Alloy Negative Active Material, Negative Active Material Composition Including Same, Rechargeable Lithium Battery Including Same, and Method Of Preparing Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing FIGURE, the dimensions of layers and regions may be exaggerated for clarity of illustration. Like reference numerals refer to like elements throughout.

In some exemplary embodiments, well known technologies may not be specifically explained to, e.g., avoid ambiguous understanding of this disclosure. Unless otherwise defined, all terms used in the specification (including technical and scientific terms) may be used as meanings commonly understood to a person having ordinary knowledge in the art. In addition, unless explicitly described to the contrary, the word "comprise" and variations such as "comprises" or "comprising," will be understood to imply the inclusion of stated elements but not the exclusion of any other elements. Unless specifically described to the contrary, a singular form includes a plural form.

The negative active material for a rechargeable lithium battery according to an exemplary embodiment may include a silicon-based shape memory alloy active material that includes, e.g., a silicon-based material precipitated on a $Ni_2Mn_{1-X}Z_X$ ($0 \leq X \leq 1$, Z is Al, Ga, In, Sn, or Sb) shape memory alloy (a Ni—Mn—Z based shape memory alloy, hereinafter, referred to as Ni—Mn—Z SMA) basic material. The Ni—Mn—Z SMA may be present in the form of a matrix.

The silicon-based material may include at least one selected from Si, $SiO_x$ ($0<x<2$), a Si—C composite, a Si—Y alloy (wherein, Y is an element at least one selected from an alkali metal, an alkaline-earth metal, a transition element, a Group 13 element, a Group 14 element, a Group 15 element, a Group 16 element, a rare earth element, and a combination thereof), and a combination thereof. The silicon-based material may be used, e.g., in an uncoated state or it may be coated with a conductive carbon on the surface thereof.

Non-limiting examples of the Y include, e.g., at least one of Li, Mg, Ca, Sr, Ba, Ti, V, Cr, Mn, Fe, Co, Ni, Cu, Zn, Zr, Nb, Mo, Ru, Rh, Pd, Ag, Cd, Hf, Ta, W, Re, Os, Ir, Pt, Au, Hg, Al, Sn, Sb, and a combination thereof.

A shape memory alloy negative active material where a silicon-based material is precipitated on a Ni—Mn—Z SMA basic material may be prepared by forming a mixture by mixing and melting Ni, Mn, Z and a silicon-based material and then quenching the mixture.

The mixing and melting may be carried out by heating the mixture, which includes the Ni, Mn, Z and the silicon-based material, to a temperature within a range of about 1000° C. to about 1500° C. and maintaining that temperature for a time within a range of about 1 hour to about 10 hours. The temperature range is not limited thereto, e.g., the temperature may be set within a range of about 1200° C. to about 1300° C., about 1100° C. to about 1400° C., etc. Further, the time range is not limited thereto, e.g., the temperature of the mixture may be maintained in a range of, e.g., about 3 hours to 5 hours, about 4 hours to about 8 hours, etc. The heating temperature may be different according to, e.g., the components therein and/or a ratio of the SMA basic material in the mixture.

The silicon-based material may be mixed and molten in an amount of about 60 wt % to 100 wt % based on, e.g., relative to, an amount of the Ni—Mn—Z SMA basic material. For example, a ratio of a weight of the silicon-based material to a weight of the Ni—Mn—Z SMA basic material in the mixture may be about 3:5 to about 1:1. However, a range for the amount of silicon-based material is not limited thereto, e.g., the amount may be within a range of about 65 wt % to about 85 wt %, about 70 wt % to about 90 wt %, about 75 wt % to about 95 wt %, etc. Without intending to be bound by this theory, when the amount falls in the above ranges, the stress applied by the volumetric change of the silicon-based material may be efficiently removed and the expanded volume may be resumed to the original state.

As for the quenching method, diverse methods known to those of an ordinary skill in the art may be used, e.g., a method of quenching the material in water, oil, or nitrogen, or a melt spinning method may be used. The quenching process may rapidly cool the mixture including Ni, Mn, Z and the silicon-based material to form the Ni—Mn—Z SMA.

The grain size of the Ni—Mn—Z shape memory alloy (SMA) basic material may be controlled to range from about 0.1 nm to about 500 nm during the quenching process. However, the range for the grain size is not limited thereto. When the grain size falls within the range, the silicon-based material may be evenly and/or substantially uniformly precipitated onto Ni—Mn—Z SMA. The conductive material may be evenly and/or substantially uniformly dispersed during the negative active material composition preparation, and a high-density electrode may be formed, e.g., easily formed.

The particle diameter of the silicon-based material precipitated during the quenching process may be controlled to range from about 10 nm to about 200 nm. However, the range for the particle diameter is not limited thereto, e.g., the range may be about 50 nm to about 150 nm, about 75 nm to about 125 nm, etc. Without intending to be bound by this theory, when the particle diameter size falls in the above ranges, the expansion of Si occurring during charge and discharge cycles of a battery may be controlled within the matrix, e.g., controlled within a workable range.

When the quenching process is not performed and the mixture is cooled down slowly instead, the Si in the melting pot is not precipitated and second phases with elements such as Ni, Ti (e.g., in the case that the silicon-based material includes Ti from the Si—Y alloy in which Y includes Ti) may be produced. Also, when an indefinite slow cooling is performed, Si may not be precipitated. Further, even if the Si is precipitated, the size of the resultant Si crystal, i.e., the particle diameter thereof, becomes so great that the matrix cannot endure the volumetric expansion during the charge and discharge cycles of a battery, thereby deteriorating the performance of the battery. To reduce the possibility of and/or prevent such a result, the Si may be precipitated by performing a quenching process, e.g., instead of performing a slow cooling process.

Through the preparing process described above, the silicon-based material precipitated in a different phase from the alloy phase of the Ni—Mn—Z SMA may be substantially uniformly distributed in the Ni—Mn—Z SMA having a shape memory characteristic. When a slow cooling is performed instead of a quenching process, the silicon-based material may form an alloy with Ni, Mn, and Z. In this case, the shape memory effect of the Ni—Mn—Z SMA may not be effectively used. Further, lithium ions may be effectively intercalated and deintercalated on the silicon-based material. For example, the lithium ions may be effectively able to be intermixed with the silicon-based material during one of a charge cycle and a discharge cycle and be able to move away from the silicon-based material in the other of the charge cycle and the discharge cycle.

Silicon theoretically has a capacity of about 4000 mAh/g, e.g., in particular about 4017 mAh/g. Accordingly, a rechargeable lithium battery may have a high capacity, e.g., compared with a case where a carbon-based active material theoretically having a capacity of about 380 mAh/g is applied.

The Ni—Mn—Z SMA may have fine elasticity and may also have shape memory characteristics. Accordingly, if its structural appearance is deformed due to, e.g., external stress, the structure may be brought back when, e.g., stress and temperature conditions, are restored. Also, although cycles of deformation and restoration may be repeated several times, the characteristics for going back to its original structure are substantially maintained through the cycles. Therefore, the Ni—Mn—Z SMA may serve as a buffer for buffering the stress generated when a silicon-based material repeats volumetric expansion and contraction during the charge and discharge cycles of a rechargeable lithium battery. The Ni—Mn—Z SMA may effectively help the silicon-based material that is expanded during a charge to contract back to the original state during a discharge based on the shape memory characteristics thereof. Therefore, the cycle-life characteristics of a rechargeable lithium battery having the negative active material according to exemplary embodiments of this disclosure may be improved.

The negative active material composition according to one exemplary embodiment may include a conductive material and a binder along with the silicon-based shape memory alloy active material. For example, the conductive material and the binder may be added to the mixture after the quenching process is performed thereon to form a slurry, e.g., to form a negative active material slurry.

The conductive material may be, e.g., at least one selected from a natural graphite, an artificial graphite, a carbon black, an acetylene black, a ketjen black, and a carbon fiber.

The binder may adhere the silicon-based shape memory alloy active material particles and the silicon-based shape memory alloy active material to a current collector. The binder may be, e.g., an organic binder, an aqueous binder, or a combination thereof. The organic binder may refer to a binder dissolved or dispersed in an organic solvent, e.g., N-methylpyrrolidone (NMP). The aqueous binder may refer to a binder using water as a solvent or a dispersion medium. Non-limiting examples of the organic binder include a polyvinylidene fluoride (PVDF), a polyimide, a polyamideimide, or a combination thereof. Non-limiting examples of aqueous binder include a rubbery binder such as a styrene-butadiene rubber, an acrylate styrene-butadiene rubber, an acrylonitrile-butadiene rubber, an acrylic rubber, a butyl rubber, a fluorine rubber, and the like, a polytetrafluoroethylene, a polyethylene, a polypropylene, an ethylenepropylenecopolymer, a polyethyleneoxide, a polyvinylpyrrolidone, a polyepichlorohydrine, a polyphosphazene, a polyacrylonitrile, a polystyrene, an ethylenepropylenedienecopolymer, a polyvinylpyridine, a chlorosulfonated polyethylene, a latex, a polyester resin, an acrylic resin, a phenolic resin, an epoxy resin, a polyvinylalcohol, or a combination thereof.

When the aqueous binder is used, a thickener may further be added. The thickener may impart a non-viscosus aqueous binder with viscosity. The thickener may also impart ion conductivity. Non-limiting examples of the thickener may include a carboxymethyl cellulose (CMC), a hydroxypropyl methylcellulose (HPMC), hydroxymethyl cellulose, hydroxyethyl cellulose, hydroxypropyl cellulose, or a combination thereof.

Selectively, other than the silicon-based shape memory alloy active material, at least one additional negative active material selected from a graphite, a graphene, and a carbon nanowire may be further included. The additional negative active material may be used to control the capacity of the active material. For example, the additional negative active material may be added to the mixture that has the quenching process performed thereon.

The additional negative active material may be included in an amount of about 0.01 wt % to about 95 wt % based on, e.g., relative to, a total amount of the silicon-based shape memory alloy active material and the additional negative active material, e.g., 100 wt % of the silicon-based shape memory alloy active material and the additional negative active material. For example, a ratio of a weight of the additional negative active material to a weight of the silicon-based shape memory alloy active material may be about 0.01:99.9 to about 95:5. However, a range for the amount of the additional negative active material is not limited thereto, e.g., the amount may be within a range of about 10 wt % to about 80 wt %, about 20 wt % to about 70 wt %, 30 wt % to about 60 wt %, 40 wt % to about 50 wt %, etc. Without intending to be bound by this theory, when the amount falls in the above ranges, the capacity may be controlled.

The conductive material may be included in an amount of about 5 wt % to about 20 wt % based on, e.g., relative to, the amount of the negative active material composition. However, a range for the amount of the conductive material is not limited thereto, e.g., the amount may be within a range of about 8 wt % to about 18 wt %, 10 wt % to about 15 wt %, etc. Without intending to be bound by this theory, when the amount of the conductive material falls in the above ranges, the electrochemical characteristics and the energy density per weight of the rechargeable lithium battery may be controlled within a target range. If the amount of the conductive material goes out of the amount range, the battery characteristics may be affected. If the amount of the conductive material exceeds the amount range, the amount of Si is decreased in the entire composition, and the capacity is reduced. If the amount of the conductive material is less than the amount range, the transfer path of electrons is cut off, and the performance is deteriorated.

A binder may be included in an amount of about 5 wt % to about 20 wt % based on the amount of the negative active material composition. However, a range for the amount of the conductive material is not limited thereto, e.g., the amount may be within a range of about 8 wt % to about 18 wt %, 10 wt % to about 15 wt %, etc. Without intending to be bound by this theory, when the amount of the binder falls in the above ranges, sufficient adherence may be secured between the active material and the current collector. Further, the binder may not have a substantial affect on the increasing the capacity of the resultant batteries.

The binder may also affect the characteristics of a battery when the amount of the binder is outside of the above ranges, just as the conductive agent may affect the characteristics of the battery when the amount is outside of the above ranges. As the amount of the binder substantially exceeds about 20 wt % based on the amount of the silicon-based shape memory alloy active material, the resistance may be increased in the interface and thus electrons and ions may not be transferred smoothly so as to deteriorate battery performance. When the amount of the binder is substantially less than about 5 wt % based on the amount of the silicon-based shape memory alloy active material, the adherence to an electrode plate may become so weak that the electrons hardly transfer, thus deteriorating the battery performance.

The negative active material composition may be prepared by mixing the silicon-based shape memory alloy active material, the conductive material, and the binder with a thickener that is selectively added, and performing a mechanical treatment, e.g., a ball milling treatment.

Hereinafter, referring to FIG. 1, rechargeable lithium batteries in accordance with exemplary embodiments of this disclosure including the negative active materials prepared in accordance with the embodiments of this disclosure are described. FIG. 1 illustrates a schematic view showing a rechargeable lithium battery according to one embodiment. The rechargeable lithium battery according to one embodiment may include a positive electrode 100, a negative electrode 110 including a negative active material layer 114 according to exemplary embodiments, and a separator 120 between the positive electrode 100 and negative electrode 110. An electrolyte solution 130 may be impregnated in negative electrode 110 and separator 120.

The positive electrode 100 may include a current collector 102 and a positive active material layer 104 may be disposed on the current collector 102. The negative electrode 110 may include a current collector 112 and the negative active material layer 114 may be disposed on the current collector 112.

The current collector 102 may include any metal having a high conductivity and being capable of adhering to the positive active material layer 104, e.g., being adhered easily while having no or substantially no reactivity in a voltage range of a rechargeable lithium battery. For example, the current collector 102 may be an aluminum (Al) foil, an aluminum alloy foil, and the like. However, embodiments are not limited thereto.

The positive active material layer 104 may include a positive active material. The positive active material may include, e.g., lithiated intercalation compounds that reversibly intercalate and deintercalate lithium ions. For example, positive active material may include a composite oxide including at least one selected from cobalt, manganese, nickel, and lithium.

For example, at least one of the following lithium-containing compounds may be used: a $Li_aA_{1-b}R_bD_2$ ($0.90 \le a \le 1.8$ and $0 \le b \le 0.5$), a $Li_aE_{1-b}R_bO_{2-c}D_c$ ($0.90 \le a \le 1.8$, $0 \le b \le 0.5$, and $0 \le c \le 0.05$), a $LiE_{2-b}R_bO_{4-c}D_c$ ($0 \le b \le 0.5$ and $0 \le c \le 0.05$), a $Li_aNi_{1-b-c}Co_bR_cD_\alpha$ ($0.90 \le a \le 1.8$, $0 \le b \le 0.5$, $0 \le c \le 0.05$, and $0 < \alpha \le 2$), a $Li_aNi_{1-b-c}Co_bR_cO_{2-\alpha}Z_\alpha$ ($0.90 \le a \le 1.8$, $0 \le b \le 0.5$, $0 \le c \le 0.05$, and $0 < \alpha < 2$), a $Li_aNi_{1-b-c}Co_bR_cO_{2-\alpha}Z_\alpha$ ($0.90 \le a \le 1.8$, $0 \le b \le 0.5$, $0 \le c \le 0.05$, and $0 < \alpha < 2$), a $Li_aNi_{1-b-c}Mn_bR_cD_\alpha$ ($0.90 \le a \le 1.8$, $0 \le b \le 0.5$, $0 \le c \le 0.05$, and $0 < \alpha \le 2$), a $Li_aNi_{1-b-c}Mn_bR_cO_{2-\alpha}Z_\alpha$ ($0.90 \le a \le 1.8$, $0 \le b \le 0.5$, $0 \le c \le 0.05$, and $0 < \alpha < 2$), a $Li_aNi_{1-b-c}Mn_bR_cO_{2-\alpha}Z_2$ ($0.90 \le a \le 1.8$, $0 \le b \le 0.5$, $0 \le c \le 0.05$, and $0 < \alpha < 2$), $Li_aNi_bE_cG_dO_2$ ($0.90 \le a \le 1.8$, $0 \le b \le 0.9$, $0 \le c \le 0.5$, and $0.001 \le d \le 0.1$), a $Li_aNi_bCo_cMn_dGeO_2$ ($0.90 \le a \le 1.8$, $0 \le b \le 0.9$, $0 \le c \le 0.5$, $0 \le d \le 0.5$, and $0.001 \le e \le 0.1$), a $Li_aNiG_bO_2$ ($0.90 \le a \le 1.8$ and $0.001 \le b \le 0.1$), $Li_aCoG_bO_2$ ($0.90 \le a \le 1.8$ and $0.001 \le b \le 0.1$), a $Li_aMnG_bO_2$ ($0.90 \le a \le 1.8$ and $0.001 \le b \le 0.1$), a $Li_aMn_2G_bO_4$ ($0.90 \le a \le 1.8$ and $0.001 \le b \le 0.1$), a $QO_2$; $QS_2$; $LiQS_2$; $V_2O_5$; $LiTO_2O_5$; $LiTO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$), and $LiFePO_4$. In the above formulas, the A is Ni, Co, Mn, or a combination thereof. The R is Al, Ni, Co, Mn, Cr, Fe, Mg, Sr, V, a rare earth element, or a combination thereof. The D is O, F, S, P, or a combination thereof. The E is Co, Mn, or a combination thereof. The Z is F, S, P, or a combination thereof. The G is Al, Cr, Mn, Fe, Mg, La, Ce, Sr, V, or a combination thereof. The Q is Ti, Mo, Mn, or a combination thereof. The T is Cr, V, Fe, Sc, Y, or a combination thereof. The J is V, Cr, Mn, Co, Ni, Cu, or a combination thereof.

The lithium-containing compound may have a coating layer on the surface or may be mixed with another compound having a coating layer. The coating layer may include at least one coating element compound selected from an oxide of a coating element, a hydroxide of the coating element, an oxyhydroxide of the coating element, an oxycarbonate of the coating element, and a hydroxyl carbonate of the coating element. The compound for a coating layer may be amorphous or crystalline. The coating element for a coating layer may include, e.g., Mg, Al, Co, K, Na, Ca, Si, Ti, V, Sn, Ge, Ga, B, As, Zr, or a mixture thereof. The coating layer may be formed in a method having no adverse influence on properties of a positive active material by including these elements in the compound. For example, the method may include any coating method such as spray coating, dipping, and the like, but is not illustrated in more detail, since it is well-known to those who work in the related field.

The positive active material layer 104 may also include a binder and a conductive material. The binder may improve binding properties of the positive active material particles to one another and also with a current collector 102. Non-limiting examples of the binder may include a polyvinylalcohol, a carboxylmethyl cellulose, a hydroxypropyl cellulose, a polyvinylchloride, a carboxylated polyvinylchloride, a polyvinylfluoride, an ethylene oxide-containing polymer, a polyvinylpyrrolidone, a polyurethane, a polytetrafluoroethylene, a polyvinylidene fluoride, a poly acrylic acid, a polyethylene, a polypropylene, a styrene-butadiene rubber, an acrylate styrene-butadiene rubber, an epoxy resin, a nylon, or a combination thereof.

The conductive material may be included to, e.g., improve conductivity of the positive electrode 100. Any electrically conductive material may be used as a conductive material unless it causes a chemical change of the positive electrode 100. Non-limiting examples of a conductive material for the positive electrode 100 may include a carbon black, an acetylene black, a ketjen black, a carbon fiber, a metal powder or a metal fiber of copper, nickel, aluminum, silver, and the like, a polyphenylene derivative, or a combination thereof.

The current collector 112 may include any metal having a high conductivity and being capable of adhering to the negative active material layer 114, e.g., being adhered easily while having no or substantially no reactivity in a voltage range of a rechargeable lithium battery. For example, the current collector 112 may include a copper foil, a nickel foil, a stainless steel foil, a titanium foil, a nickel foam, a copper foam, a polymer substrate coated with a conductive metal, or a combination thereof. However, embodiments are not limited thereto.

The negative active material layer 114 may be formed using the negative active material composition according to exemplary embodiments described above.

The positive electrode 100 and negative electrode 110 may each be fabricated by a method that includes mixing the active material, a conductive material, and a binder to prepare an active material composition (or slurry) and coating the composition on current collectors 102 and 112, respectively. The solvent may include, e.g., at least one of N-methylpyrrolidone, dimethyl formamide, N,N-dimethylaminopropylamine, ethyleneoxide, tetrahydrofuran, and the like, but is not limited thereto. The active material composition (or slurry) may further include a thickener to adjust viscosity. For example, the thickener may include, e.g., at least one of carboxyl methyl cellulose, hydroxymethyl cellulose, hydroxyethyl cellulose, hydroxypropyl cellulose, and the like.

The separator 120 separates the positive electrode 100 and negative electrode 110 electrically to, e.g., reduce the possibility of and/or prevent a short circuit therebetween. The separator 120 may also provide a path for the transfer of lithium ions. The separator 120 may include, e.g., a polyethylene, a polypropylene, or a polyvinylidene fluoride monolayer, or a multilayer including two or more layers, or a mixed multilayer such as a polyethylene/polypropylene mixed bilayer, a polyethylene/polypropylene/polyethylene mixed trilayer, a polypropylene/polyethylene/polypropylene mixed trilayer, and the like.

The electrolyte solution 130 may include a non-aqueous organic solvent and a lithium salt, according to an exemplary embodiment.

The non-aqueous organic solvent may serve as a medium for transferring ions taking part in the electrochemical reaction of the battery. The non-aqueous organic solvent may be, e.g., a carbonate-based, an ester-based, an ether-based, a ketone-based, an alcohol-based, or an aprotic solvent.

The carbonate-based solvent may include, e.g., at least one of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include, e.g., at least one of methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include, e.g., at least one of dibutyl ether, tetraglyme, diglyme, dimethoxyethane, 2-methyltetrahydrofuran, tetrahydrofuran, and the like. The ketone-based solvent may include, e.g., at least one of cyclohexanone, and the like. The alcohol-based solvent may include, e.g., at least one of ethanol, isopropyl alcohol, and the like. The aprotic solvent may include, e.g., at least one of nitriles such as R—CN (wherein R is a C2 to C20 linear, branched, or cyclic hydrocarbon group that may include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with, e.g., a desirable battery performance.

The carbonate-based solvent may include a mixture of a cyclic carbonate and a linear carbonate. The cyclic carbonate and the linear carbonate may be mixed together at a volume ratio of about 1:1 to about 1:9. However, the volume ratio is not limited thereto, e.g., the volume ratio may be about 1:2 to about 1:8, about 1:3 to about 1:7, about 1:4 to about 1:6, etc. When the mixture is used as an electrolyte, the electrolyte performance may be enhanced.

The electrolyte solution 130 may further include, e.g., mixtures of carbonate-based solvents and aromatic hydrocarbon-based solvents. The carbonate-based solvents and the aromatic hydrocarbon-based solvents may be mixed together at a volume ratio of about 1:1 to about 30:1. However, the value ratio is not limited thereto, e.g., the volume ratio may be about 5:1 to about 25:1, about 10:1 to about 20:1, about 15:1 to about 22:1, etc.

The aromatic hydrocarbon-based organic solvent may be represented by the following Chemical Formula 1.

[Chemical Formula 1]

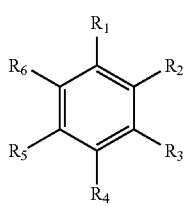

In Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include, e.g., at least one of a benzene, a fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, a toluene, a fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, an iodotoluene, 1,2-diiodotoluene, 1,3-diiodotoluene, 1,4-diiodotoluene, 1,2,3-triiodotoluene, 1,2,4-triiodotoluene, a xylene, and a combination thereof.

The non-aqueous electrolyte may further include a vinylene carbonate or an ethylene carbonate-based compound of the following Chemical Formula 2.

[Chemical Formula 2]

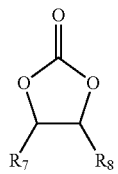

In Chemical Formula 2, $R_7$ and $R_8$ are each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

The ethylene carbonate-based compound may include, e.g., at least one of difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is used, the usage amount may be adjusted within an appropriate range.

The lithium salt dissolved in an organic solvent may supply lithium ions in the battery, may operate a basic operation of a rechargeable lithium battery, and may improve lithium ion transport between positive and negative electrodes. Examples of the lithium salt include, e.g., at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bisoxalate borate; LiBOB), and a combination thereof. The lithium salt may be used in a concentration of about 0.1 M to about 2.0 M, e.g., within the electrolyte solution 130. However, embodiments are not limited thereto, e.g., the concentration may be about 0.5 M to about 1.5 M, about 1.0 M to about 1.8 M, etc. When the lithium salt is included at the above concentration range, electrolyte performance and lithium ion mobility may be enhanced, e.g., due to optimal electrolyte conductivity and viscosity.

Rechargeable lithium batteries may be classified as lithium ion batteries, lithium ion polymer batteries, and lithium polymer batteries according to the presence of a separator 120 and/or the kind of electrolyte solution 130 used in the battery. The rechargeable lithium batteries may have a variety of shapes and sizes, e.g., the shapes may include cylindrical, prismatic, or coin-type batteries, and the sizes may be thin film batteries or may be rather bulky in size. Since exemplary structures and fabricating methods for lithium ion batteries are well known in the art, detailed descriptions thereof are omitted, e.g., in order to prevent this disclosure from being interpreted ambiguously.

In the rechargeable lithium battery illustrated in FIG. 1, according to an exemplary embodiment, the lithium ions coming out from the positive active material layer 104 during the first charge may be intercalated, e.g., mixed, into the negative active material layer 114. The lithium ions may then be deintercalated, e.g., released, during a discharge from the negative active material layer 114 to become intercalated, e.g., mixed, into the positive active material layer 104. For example, lithium ions may transfer energy by going back and forth between the positive electrode 100 and the negative electrode 110, so that charge and discharge cycles may be performed in the rechargeable lithium battery.

Since the negative electrode 110 includes a high-capacity silicon-based material, the rechargeable lithium battery may represent high-capacity characteristics. Also, although the silicon-based material that constitutes the negative active material layer 114 may expand when the rechargeable lithium battery is charged, the Ni—Mn—Z SMA basic material that constitutes the negative active material layer 114 may relieve the stress generated when the volume of the silicon-based material is expanded. For example, the Ni—Mn—Z SMA basic material may effectively help the silicon-based material, e.g., whose volume may be expanded to about 300% to about 400% due to the intercalation of lithium during a charge cycle, according to the shape memory characteristics to contract back into its original state after lithium is deintercalated during a discharge cycle. Therefore, the cycle-life characteristic of the rechargeable lithium battery may be improved.

The following experimental examples and comparative experimental examples illustrate this disclosure in more detail. These experimental examples and comparative experimental examples, however, are not in any sense to be interpreted as limiting the scope of this disclosure.

Fabrication of Negative Electrode

Experimental Example 1

A silicon-based shape memory alloy negative active material where silicon was precipitated on a $Ni_2Mn_1$ basic material was prepared by mixing and melting about 10 g of $Ni_2Mn_1$ and about 6 g of Si, heating the mixture at 1200° C. for about 3 to 6 hours, and quenching the mixture at about 1200° C. through a melt spinning method. Herein, the $Ni_2Mn_1$ shape memory alloy basic material was formed in the shape of ribbon, and it was pulverized into the size of about 10 μm to about 20 μm. The particle diameter of the Si particles was about 100 nm.

Subsequently, a negative active material slurry was prepared by using about 0.8 g of the silicon-based shape memory alloy negative active material, which was obtained from the quenching, and about 7.2 g of graphite as a negative active material. The silicon-based shape memory alloy negative active material and the graphite negative active material were mixed with about 1 g of a polyamideimide binder and about 1 g of carbon black in an N-methylpyrrolidone solvent. A negative electrode was fabricated through an electrode fabrication process of coating a Cu-foil current collector with the negative active material slurry.

Experimental Example 2

A silicon-based shape memory alloy negative active material where silicon was precipitated on a $Ni_2Mn_1$ basic material was prepared by mixing and melting about 10 g of $Ni_2Mn_1$ and about 6.8 g of Si and quenching the mixture at about 1200° C. through a melt spinning method. Herein, the $Ni_2Mn_1$ shape memory alloy basic material was formed in the shape of ribbon, and it was pulverized into the size of about 10 μm to about 20 μm. The particle diameter of the Si particles was about 50 nm.

Subsequently, a negative active material slurry was prepared by using about 0.8 g of the silicon-based shape memory alloy negative active material, which was obtained from the quenching, and about 7.2 g of graphite as a negative active material. The silicon-based shape memory alloy negative active material and the graphite negative active material were mixed with about 1 g of a polyamideimide binder, and about 1 g of carbon black as a conductive material in an N-methylpyrrolidone solvent. A negative electrode was fabricated through an electrode fabrication process of coating a Cu-foil current collector with the negative active material slurry.

Comparative Experimental Example 1

A negative active material slurry was prepared by using about 0.8 g of Ni—Ti—Si alloy and about 7.2 g of graphite as a negative active material. The Ni—Ti—Si alloy and the graphite were mixed with about 1 g of a polyamideimide binder and about 1 g of carbon black as a conductive material in an N-methylpyrrolidone solvent. A negative electrode was fabricated through an electrode fabrication process of coating a Cu-foil current collector with the negative active material slurry.

Comparative Experimental Example 2

A negative active material slurry was prepared by using about 8 g of graphite as a negative active material. The graphite was mixed with about 1 g of a polyamideimide binder and about 1 g of carbon black as a conductive material in an N-methylpyrrolidone solvent. A negative electrode was fabricated through an electrode fabrication process of coating a Cu-foil current collector with the negative active material slurry.

Comparative Experimental Example 3

A negative active material slurry was prepared by using about 0.4 g of silicon oxide (SiO) powder and about 7.6 g of graphite as a negative active material. The SiO powder and the graphite were mixed with about 1 g of a polyamideimide binder and about 1 g of carbon black as a conductive material in an N-methylpyrrolidone solvent. A negative electrode was fabricated through an electrode fabrication process of coating a Cu-foil current collector with the negative active material slurry.

Fabrication of Battery Cell

A positive electrode slurry was prepared by adding about 90 g of $LiCoO_2$ as a positive active material, about 5 g of PVDF (polyvinylidenefluoride) as a binder, and about 5 g of acetylene black as a conductive material in about 5 g of an NMP solvent, and coating an aluminum current collector with the positive electrode slurry. The aluminum current collector coated with the positive electrode slurry was dried in an oven at about 120° C. and then rolled up so as to fabricate a positive electrode.

A non-aqueous electrolyte was prepared by dissolving $LiBF_4$ and $LiPF_6$ in an organic solvent having a composition of ethylene carbonate(EC):ethylmethyl carbonate(EMC):diethyl carbonate(DEC)=3:2:5(v:v:v) in such a manner that the sum of the concentrations of $LiBF_4$ and $LiPF_6$ became 1.15 M.

Coin-type elements were fabricated by interposing a film separator formed of a polyethylene material between the positive electrode and the negative electrodes fabricated according to Experimental Examples 1 and 2 and Comparative Experimental Examples 1 to 3, and then coin-type rechargeable lithium battery cells were manufactured by implanting a non-aqueous electrolyte into the coin-type elements.

Evaluation of Physical Properties

Measurement of Capacity

The coin-type rechargeable lithium battery cells including the negative active materials of Experimental Examples 1 and 2 and Comparative Experimental Examples 1 to 3 were charged and discharged once at about 0.1 C and their charge capacities, discharge capacities, and initial efficiencies were measured and the measurement results are shown in the following Table 1.

TABLE 1

|  | Charge capacity (mAh/g) | Discharge capacity (mAh/g) | Initial efficiency (%) |
| --- | --- | --- | --- |
| Experimental Example 1 | 619 | 586 | 94.7 |
| Experimental Example 2 | 691 | 623 | 90.2 |
| Comparative Experimental Example 1 | 561 | 502 | 85.9 |
| Comparative Experimental Example 2 | 355 | 338 | 88.67 |
| Comparative Experimental Example 3 | 491 | 419 | 85.2 |

It may be seen from the results of Table 1 that the Experimental Examples 1 and 2 had remarkably improved initial efficiency as compared with the Comparative Experimental Examples 1 to 3.

Measurement of Cycle-Life Characteristic

The capacity retention (cycle-life characteristics) of the coin-type rechargeable lithium battery cells including the negative active materials of Experimental Examples 1 and 2 and comparative Experimental Examples 1 to 3 were measured and the measurement results are shown in the following Table 2. The capacity retention (cycle-life characteristic) were measured during the performing of a plurality of charge and discharge cycles at about 25° C. at about 1.0 C in 20 times. The measurement results are represented as a percentage based on a ratio of the discharge capacity at the $20^{th}$ cycle to the discharge capacity at the first cycle.

TABLE 2

| Experimental Example | $20^{th}$ cycle capacity retention (%) |
| --- | --- |
| Experimental Example 1 | 92 |
| Experimental Example 2 | 89 |
| Comparative Experimental Example 1 | 88 |
| Comparative Experimental Example 2 | 86 |
| Comparative Experimental Example 3 | 58.5 |

It may be seen from Table 2 that since the capacity retentions of the rechargeable lithium battery cells of Experimental Examples 1 and 2 at the $20^{th}$ cycle were higher than the capacity retentions of the rechargeable lithium battery cells of Comparative Experimental Examples 1 to 3 at the $20^{th}$ cycle, the cycle characteristics of the rechargeable lithium battery cells including the negative active materials in accordance with the exemplary embodiments of this disclosure were improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

By way of summation and review, a rechargeable battery may be a rechargeable lithium battery. The rechargeable lithium battery may use an organic electrolyte solution therein and may produce a discharge voltage that is twice or more than a discharge voltage of a conventional battery using an alkali aqueous solution therein, and accordingly implements high energy density. Therefore, the rechargeable lithium battery may be advantageous for down-sizing and producing light-weight devices while still having a high-capacity charge and discharge.

A carbon-based material may be used as a negative active material in a rechargeable battery, but the carbon-based material may have a limited capacity. To fulfill the requirement of a higher-capacity, researchers are studying other options for negative electrode materials.

As an alternative for the negative active material, researchers are studying silicon. Silicon theoretically may have a maximum large capacity of about 4000 mAh/g, and thus it may be considered as having a high-capacity compared with the carbon-based material. However, silicon may crack, e.g., due to a change in volume during charge and discharge cycles. Further, if silicon active material particles are broken, during repeated charge and discharge cycles, the capacity of the battery may be drastically deteriorated and the cycle-life characteristics may be shortened.

In contrast, embodiments, e.g., ones of the exemplary embodiments discussed above, provide a silicon-based shape memory alloy negative active material capable of improving capacity and cycle-life characteristics of a rechargeable lithium battery. Embodiments further provide a negative active material capable of improving capacity and cycle-life characteristics. Embodiments also provide a method of preparing a negative active material being capable of improving capacity and cycle-life characteristics is provided. Embodiments may further provide a rechargeable lithium battery having improved capacity and cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A silicon-based shape memory alloy negative active material, comprising:
a silicon-based material precipitated on a $Ni_2Mn_{1-x}Z_x$ shape memory alloy basic material, wherein:
$0 \leq x \leq 1$, and
Z is one of Al, Ga, In, Sn, or Sb;

wherein the silicon-based material:
has a particle diameter of about 10 nm to about 200 nm; and
is included in an amount of about 60 wt % to about 100 wt %, based on an amount of the memory alloy basic material.

2. The negative active material as claimed in claim 1, wherein the $Ni_2Mn_{1-X}Z_X$ shape memory alloy basic material has a grain size of about 0.1 nm to about 500 nm.

3. The negative active material as claimed in claim 1, wherein:
the silicon-based material includes at least one selected from Si, a SiOx, a Si—C composite, a Si—Y alloy, and a combination thereof,
$0<x<2$, and
Y is an element selected from an alkali metal, an alkaline-earth metal, a transition element, a Group 13 element, a Group 14 element, a Group 15 element, a Group 16 element, a rare earth element, and a combination thereof.

4. The negative active material as claimed in claim 3, wherein Y is selected from Li, Mg, Ca, Sr, Ba, Ti, V, Cr, Mn, Fe, Co, Ni, Cu, Zn, Zr, Nb, Mo, Ru, Rh, Pd, Ag, Cd, Hf, Ta, W, Re, Os, Ir, Pt, Au, Hg, Al, Sn, Sb, and a combination thereof.

5. A negative active material composition, comprising
the negative active material as claimed in claim 1;
a conductive material; and
a binder.

6. The negative active material composition as claimed in claim 5, further comprising at least one of negative active material selected from a graphite, a graphene, and a carbon nanowire.

7. The negative active material composition as claimed in claim 5, wherein the conductive material includes at least one selected from a natural graphite, an artificial graphite, a carbon black, an acetylene black, a ketjen black, and a carbon fiber.

8. The negative active material composition as claimed in claim 5, wherein the binder is selected from a polyvinylidene fluoride, a polyimide, a polyamideimide, a styrene-butadiene rubber, an acrylate styrene-butadiene rubber, an acrylonitrile-butadiene rubber, an acrylic rubber, a butyl rubber, a fluorine rubber, a polytetrafluoroethylene, a polyethylene, a polypropylene, an-ethylenepropylene copolymer, a polyethyleneoxide, a polyvinylpyrrolidone, a polyepichlorohydrine, a polyphosphazene, a polyacrylonitrile, a polystyrene, an ethylenepropylenediene copolymer, a polyvinylpyridine, a chlorosulfonated polyethylene, a latex, a polyester resin, an acrylic resin, a phenolic resin, an epoxy resin, a polyvinylalcohol, and a combination thereof.

9. The negative active material composition as claimed in claim 5, wherein the conductive material is included in an amount of about 5 wt % to about 20 wt %, based on an amount of the silicon-based shape memory alloy active material.

10. The negative active material composition as claimed in claim 5, wherein the binder is included in an amount of about 5 wt % to about 20 wt %, based on an amount of the silicon-based shape memory alloy active material.

11. A rechargeable lithium battery, comprising:
a negative electrode including the negative active material as claimed in claim 1;
a positive electrode including a positive active material; and
an electrolyte solution.

12. A method for preparing a silicon-based shape memory alloy negative active material where a silicon-based material is precipitated on a shape memory alloy basic material, the method comprising:
mixing and melting a $Ni_2Mn_{1-X}Z_X$ shape memory alloy basic material and a silicon-based material so as to produce a mixture, wherein $0 \leq x \leq 1$, and Z is Al, Ga, In, Sn, or Sb; and
quenching the mixture;
wherein the silicon-based material:
has a particle diameter of about 10 nm to about 200 nm; and
is included in an amount of about 60 wt % to about 100 wt %, based on an amount of the $Ni_2Mn_{1-X}Z_X$ shape memory alloy basic material.

13. The method as claimed in claim 12, wherein the mixing and melting include heating the mixture at a temperature of about 1100° C. to about 1500° C. and maintaining the temperature for about 1 hour to about 10 hours.

14. The method as claimed in claim 12, wherein the quenching process is performed such that the shape memory alloy basic material has a grain size of about 0.1 nm to about 500 nm.

15. The method as claimed in claim 12, wherein:
the silicon-based material is at least one selected from Si, a SiOx, a Si—C composite, a Si—Y alloy, and a combination thereof,
$0<x<2$, and
Y is an element selected from an alkali metal, an alkaline-earth metal, a transition element, a Group 13 element, a Group 14 element, a rare earth element, and a combination thereof.

16. The method as claimed in claim 15, wherein the Y is selected from Li, Mg, Ca, Sr, Ba, Ti, V, Cr, Mn, Fe, Co, Ni, Cu, Zn, Zr, Nb, Mo, Ru, Rh, Pd, Ag, Cd, Hf, Ta, W, Re, Os, Ir, Pt, Au, Hg, Al, Sn, Sb, and a combination thereof.

* * * * *